United States Patent
Johnson et al.

(10) Patent No.: US 11,739,905 B1
(45) Date of Patent: Aug. 29, 2023

(54) LIGHT ASSEMBLY PROVIDING PILLAR LAMP FOR MOTOR VEHICLE

(71) Applicant: Ford Global Technologies, LLC, Dearborn, MI (US)

(72) Inventors: Aaron B. Johnson, Allen Park, MI (US); Luciano Lukacs, Plymouth, MI (US); Michael L. Merritt, Farmington, MI (US); Joshua Schwab, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/844,781

(22) Filed: Jun. 21, 2022

(51) Int. Cl.
| | |
|---|---|
| *F21S 43/50* | (2018.01) |
| *F21S 43/14* | (2018.01) |
| *H05B 45/20* | (2020.01) |
| *H05B 47/165* | (2020.01) |
| *H05B 47/17* | (2020.01) |
| *H05B 47/115* | (2020.01) |
| *F21Y 115/10* | (2016.01) |

(52) U.S. Cl.
CPC .............. *F21S 43/50* (2018.01); *F21S 43/14* (2018.01); *H05B 45/20* (2020.01); *H05B 47/115* (2020.01); *H05B 47/165* (2020.01); *H05B 47/17* (2020.01); *F21Y 2115/10* (2016.08)

(58) Field of Classification Search
CPC ......... F21S 43/50; F21S 43/14; H05B 47/115; H05B 47/17; H05B 47/165; H05B 45/20
See application file for complete search history.

(56) References Cited

U.S. PATENT DOCUMENTS

| | | | |
|---|---|---|---|
| 6,616,312 B2* | 9/2003 | Carter | B60Q 3/208 |
| | | | 362/232 |
| 10,576,881 B2* | 3/2020 | Dubey | B60Q 1/32 |
| 2004/0057241 A1 | 3/2004 | Lin | |
| 2009/0051517 A1 | 2/2009 | Suzuki | |
| 2013/0021811 A1* | 1/2013 | Goldwater | B62J 6/01 |
| | | | 362/249.04 |
| 2014/0096893 A1* | 4/2014 | Veerasamy | F21S 43/195 |
| | | | 156/60 |
| 2015/0036375 A1* | 2/2015 | Gold | B60J 5/0402 |
| | | | 362/516 |

(Continued)

FOREIGN PATENT DOCUMENTS

WO 2020181546 A1 9/2020

OTHER PUBLICATIONS

Starid Toyota Fortuner led Rear Pillar Light. Motorbhp.com. (n.d.). Retrieved May 26, 2022, from https://www.motorbhp.com/toyota%E2%80%90fortuner%E2%80%90led%E2%80%90rear%E2%80%90pillar%E2%80%90light.

*Primary Examiner* — Bryon T Gyllstrom
(74) *Attorney, Agent, or Firm* — Vichit Chea; Carlson, Gaskey & Olds, P.C.

(57) ABSTRACT

This disclosure relates to a light assembly that provides a pillar lamp for a motor vehicle, and a corresponding method. In some aspects, the techniques described herein relate to a motor vehicle, including: a frame including a pillar; a light assembly mounted to the pillar, wherein the light assembly includes a selectively illuminable light source; a sensor configured to generate signals indicative of a presence of a user of the motor vehicle; and a controller configured to command the light source to illuminate when the signals from the sensor indicate the user is present.

19 Claims, 3 Drawing Sheets

(56) References Cited

U.S. PATENT DOCUMENTS

| | | | |
|---|---|---|---|
| 2015/0208490 A1* | 7/2015 | Bishop | H05B 47/105 |
| | | | 315/153 |
| 2015/0266417 A1* | 9/2015 | Salter | B60Q 3/80 |
| | | | 362/510 |
| 2015/0282280 A1* | 10/2015 | Sugimoto | H01R 13/6658 |
| | | | 315/77 |
| 2015/0329041 A1* | 11/2015 | Salter | B60Q 3/242 |
| | | | 362/510 |
| 2018/0208105 A1* | 7/2018 | Salter | F21S 43/236 |
| 2018/0272935 A1* | 9/2018 | Moriwaki | H05B 45/20 |

* cited by examiner

LIGHT ASSEMBLY PROVIDING PILLAR LAMP FOR MOTOR VEHICLE

TECHNICAL FIELD

This disclosure relates to a light assembly that provides a pillar lamp for a motor vehicle, and a corresponding method.

BACKGROUND

Motor vehicles are known to include exterior lighting systems including a number of lighting and signaling devices.

SUMMARY

In some aspects, the techniques described herein relate to a motor vehicle, including: a frame including a pillar; a light assembly mounted to the pillar, wherein the light assembly includes a selectively illuminable light source; a sensor configured to generate signals indicative of a presence of a user of the motor vehicle; and a controller configured to command the light source to illuminate when the signals from the sensor indicate the user is present.

In some aspects, the techniques described herein relate to a motor vehicle, wherein, when the signals from the sensor indicate the user is present, the controller is configured to command the light source to illuminate in a custom color selected by the user.

In some aspects, the techniques described herein relate to a motor vehicle, wherein, when the signals from the sensor indicate the user is present, the controller is configured to command the light source to illuminate in a custom sequence selected by the user.

In some aspects, the techniques described herein relate to a motor vehicle, wherein the controller is configured to command the light source to increase in intensity in proportion to a proximity of the user to the motor vehicle.

In some aspects, the techniques described herein relate to a motor vehicle, wherein the controller is configured to command the light assembly to work in combination with a conspicuity lamp of the motor vehicle.

In some aspects, the techniques described herein relate to a motor vehicle, wherein the pillar is an A-pillar.

In some aspects, the techniques described herein relate to a motor vehicle, wherein the light assembly extends substantially an entire length of the A-pillar.

In some aspects, the techniques described herein relate to a motor vehicle, wherein the light source includes an optical, film-based, light emitting diode (LED).

In some aspects, the techniques described herein relate to a motor vehicle, wherein the light source includes a plurality of strips of light emitting diodes (LEDs).

In some aspects, the techniques described herein relate to a motor vehicle, further including a lens configured to direct light from the light source in a direction away from the vehicle.

In some aspects, the techniques described herein relate to a motor vehicle, wherein an exterior surface of the lens is a same color as an adjacent body panel of the motor vehicle.

In some aspects, the techniques described herein relate to a motor vehicle, wherein the lens includes a long persistent phosphor film configured to glow following deactivation of the light source.

In some aspects, the techniques described herein relate to a motor vehicle, wherein, when a vehicle lock command is received, the controller is configured to command the light source to flash three times in succession and on the third flash the controller commands the light source to gradually dim until the light source is deactivated.

In some aspects, the techniques described herein relate to a motor vehicle, wherein, when a vehicle remote start command is received, the controller is configured to command the light source to flash a first color three times in succession and on the third flash the controller commands the light source to remain illuminated while gradually transitioning the light source to another color.

In some aspects, the techniques described herein relate to a method, including: illuminating a light source of a light assembly mounted to a pillar of a motor vehicle when a presence of a user is detected.

In some aspects, the techniques described herein relate to a method, wherein the light source is illuminated in a custom color selected by the user.

In some aspects, the techniques described herein relate to a method, wherein the light source is illuminated in a custom sequence selected by the user.

In some aspects, the techniques described herein relate to a method, wherein the light source increases in intensity in proportion to a proximity of the user to the motor vehicle.

In some aspects, the techniques described herein relate to a method, wherein, in response to a vehicle lock command, the light source flashes three times in succession and on the third flash the light source gradually dims until the light source is deactivated.

In some aspects, the techniques described herein relate to a method, wherein, in response to a vehicle remote start command, the light source to flashes a first color three times in succession and on the third flash the light source remains illuminated while gradually transitioning the light source to another color.

DETAILED DESCRIPTION

This disclosure relates to a light assembly that provides a pillar lamp for a motor vehicle, and a corresponding method. Among other benefits, which will be appreciated from the below description, this disclosure provides a customizable exterior light on the pillar of the vehicle, which is not only aesthetically pleasing but also enhances a user's personal connection with their vehicle. The light assembly is provided in a readily visible location on a vehicle that is not traditionally provided with lighting. The light assembly is also useable alone or in combination with other conspicuity lamps of the vehicle to provide various signaling and other useful functions.

Figure 1:
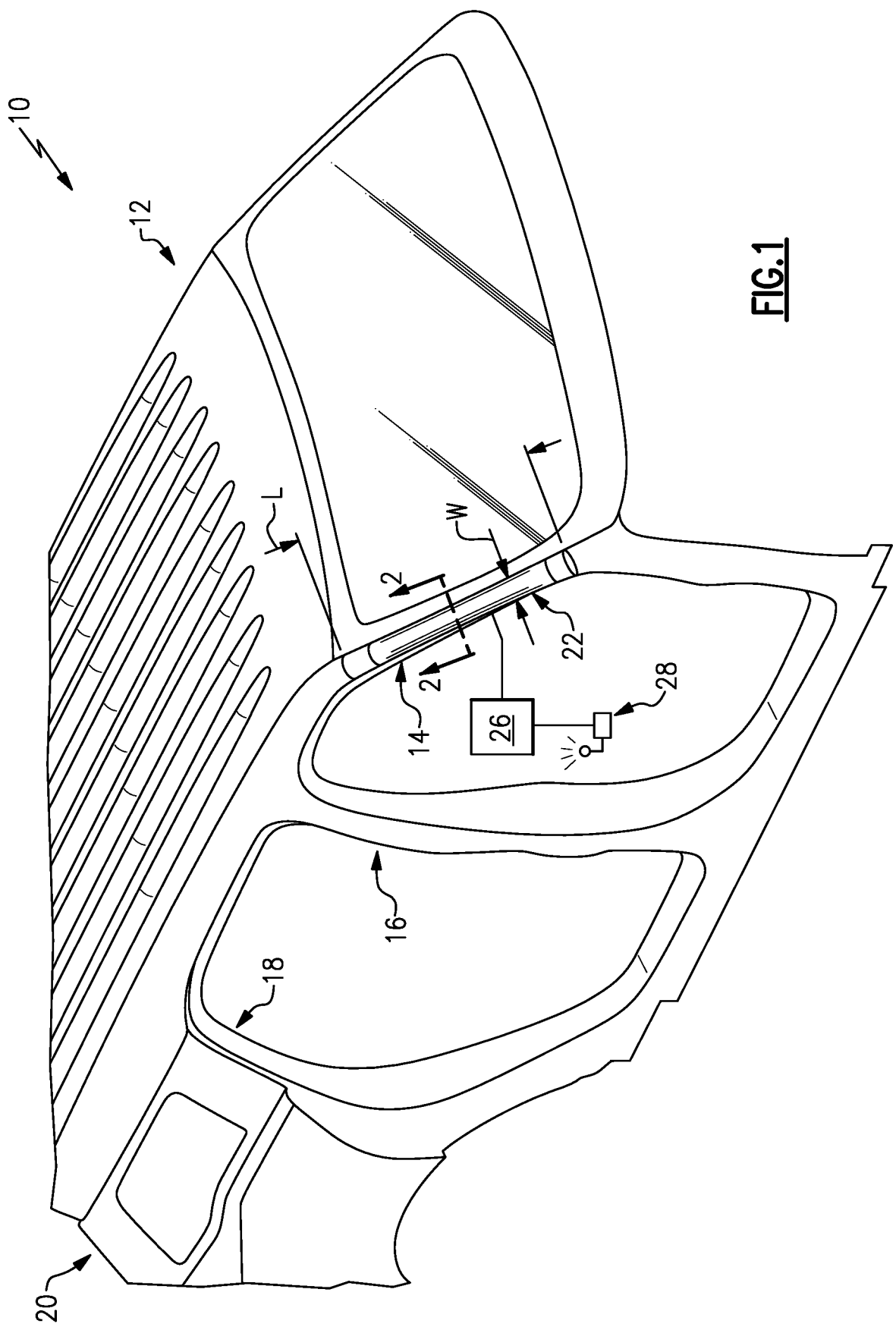
FIG. 1 is a front-perspective view of a portion of a frame of a motor vehicle with an example light assembly mounted to a pillar of the motor vehicle.

FIG. 1 illustrates a portion of a motor vehicle 10 ("vehicle 10"), and in particular illustrates a portion of a frame 12 of the vehicle 10. The frame 12 includes a plurality of pillars, which are vertically-extending supports of the frame 12. In particular, an A-pillar 14, a B-pillar 16, a C-pillar 18, and a D-pillar 20 are visible in FIG. 1. While not visible in FIG. 1, the frame 12 is symmetrical about the centerline of the vehicle 10 such that the opposite side of the frame 12 also exhibits the same pillar arrangement. While four pillars are shown on each side of the vehicle 10, this disclosure extends to vehicles that include a different number of pillars.

This disclosure relates to a light assembly 22 which is configured to selectively emit light from a pillar of the vehicle 10, and as such provides a pillar lamp. The light assembly 22 may be referred to as a "pillar lamp." In FIG. 1, the light assembly 22 is mounted to the A-pillar 14. While mounted to the A-pillar 14 in FIG. 1, the light assembly 22 could alternatively or additionally be mounted to one of the other pillars of the frame 12. Further, while only one light assembly 22 is visible in FIG. 1, a similar light assembly could alternatively or additionally be incorporated into the A-pillar on the opposite side of the vehicle 10.

The light assembly 22 is mounted to the A-pillar 14 such that light emitted from the light assembly 22 is visible from an exterior of the vehicle 10. Further, the light assembly 22 exhibits a length L extending substantially the entire length of the A-pillar 14, and a width W extending over substantially an entire width of the A-pillar 14. In this way, the light assembly 22 substantially covers the A-pillar 14 from an exterior perspective.

In this example, the light assembly 22 includes a controller 26 and a sensor 28, among other possible structures. Further, the light assembly 22 includes one or more selectively illuminable light source responsive to commands from the controller 26. In aspects of this disclosure, the controller 26 receives information from the sensor 28 and issues commands to the light assembly 22, and in particular the light source(s), based on that information. Example commands are discussed below.

The controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle 10 and light assembly 22.

While only one sensor 28 is shown in FIG. 1, the light assembly 22 could include a plurality of sensors. The sensor 28, and any other sensors of the light assembly 22, could be pre-existing sensors of the vehicle 10. As examples, the sensor 28, and any other sensors of the light assembly 22, could be transceivers, receivers, cameras (including either still or video cameras), radar (radio detection and ranging) sensors, Lidar (light detection and ranging) sensors, etc. The sensor 28 is able to generate signals for performing facial recognition techniques, for detecting a presence of a key fob associated with a user of the vehicle 10, for detecting a presence of a mobile phone associated with a user of the vehicle 10, etc. The sensor 28 can also generate signals indicative of a location of a user, a key fob of a user, or a mobile device of a user relative to the vehicle 10. The controller 26 is able to use the signals from the sensor 28 to determine a trajectory of a user, including whether the user of the vehicle 10 is approaching the vehicle 10 or moving away from the vehicle 10, as examples. The term "user" is used herein to refer to authorized users of the vehicle 10, such as an owner of the vehicle 10 or individuals authorized by the owner of the vehicle 10 to use the vehicle 10, such as family members of the owner. The term "user" also encompasses other authorized users that are not the owner, such as users of the vehicle 10 in rideshare application.

Figure 2:
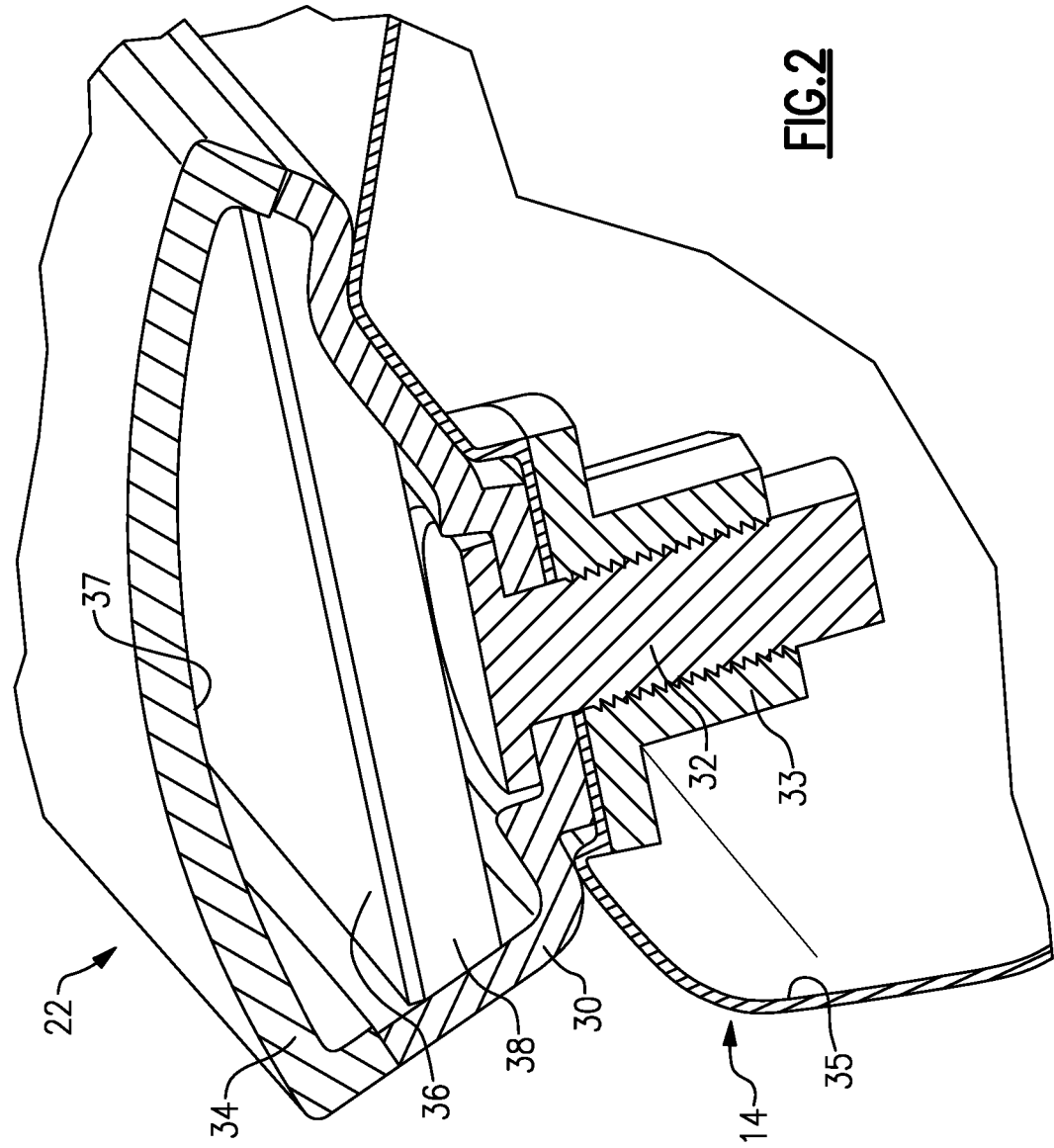
FIG. 2 is a cross-sectional view taken along line 2-2 and illustrates additional detail of the example light assembly.

FIG. 2 is a cross-sectional view taken along line 2-2 from FIG. 1, and illustrates additional detail of one embodiment of the light assembly 22. In an example, the light assembly 22 exhibits a substantially similar arrangement as to what is shown in FIG. 2 along the entirety of the length L. The light assembly 22 includes a housing 30, which is made of an opaque material in one example. The housing 30 is in direct contact with the A-pillar 14 and includes a plurality of openings, spaced-apart along the length L, configured to receive fasteners 32 that attach the housing 30 to the A-pillar 14. The fasteners 32 connect to weld nuts 33 welded to an underside 35 of the A-pillar 14 in this example. While fasteners 32 and weld nuts 33 are shown, the housing 30 could be connected to the A-pillar 14 using other techniques.

The housing 30 is connected to a lens 34. The lens 34 covers the housing 30 from an exterior perspective. The lens 34 is configured to direct light emitted from the light source(s) of the light assembly 22 outward such that the light is visible from an exterior of the vehicle 10. The lens 34 may be made entirely or partially of transparent material to provide a desired lighting pattern. The lens 34 may be made of a clear material or a colored material to provide a desired color. The lens 34 may be partially opaque to provide a desired lighting effect in some examples. Alternatively or additionally, the lens 34 may include surface features such as etchings or projections to provide a desired lighting effect in some examples. In one example, the lens 34 includes black colored ends and a transparent, clear middle section.

Inward of the lens 34, the light assembly 22 includes a light source, which in this embodiment is an optical, film-based, light emitting diode (LED) 36, which is substantially planar and fills substantially the entirety of the interior of the housing 30 in the directions of the length L and width W. The film-based LED 36 is supported by a carrier 38. In this disclosure, reference to activating or illuminating the light assembly 22 refers to illuminating or activating the light source, which in FIG. 2 is the film-based LED 36. Likewise, reference to deactivating the light assembly 22 refers to deactivating the light source.

In one example, the film-based LED 36 is provided by Nexlide-E, which is offered commercially by LG Innotek. The film-based LED 36 is selectively illuminable in response to commands from the controller 26. The film-based LED 36 is capable of illuminating in a plurality of different colors, in a plurality of different sequences, and at variable intensities, as commanded by the controller 26.

The carrier 38 is a structure capable of supporting the film-based LED 36. The carrier 38 and the fastener 32 may be configured to seal the film-based LED 36 from the environment. Further, the lens 34 is attached to the housing 30 in a manner that seals the film-based LED 36 from the environment.

In an aspect of this embodiment, an underside 37 of the lens 34 can be coated with a long persistent phosphor film to allow the light assembly 22 to glow following deactivation of the film-based LED 36.

In another aspect of this embodiment, the exterior surface of the lens 34 can exhibit a common color with the exterior surfaces of the adjacent body structures of the vehicle 10, such as a common color with the doors and other adjacent parts of the body of the vehicle 10. In this way, the light assembly 22 will not be readily identified as a light assembly, but will instead seemingly blend into the remainder of the body of the vehicle 10, until the light assembly 22 is illuminated, at which point the light assembly 22 will be readily distinguishable from the body of the vehicle 10.

Figure 3:
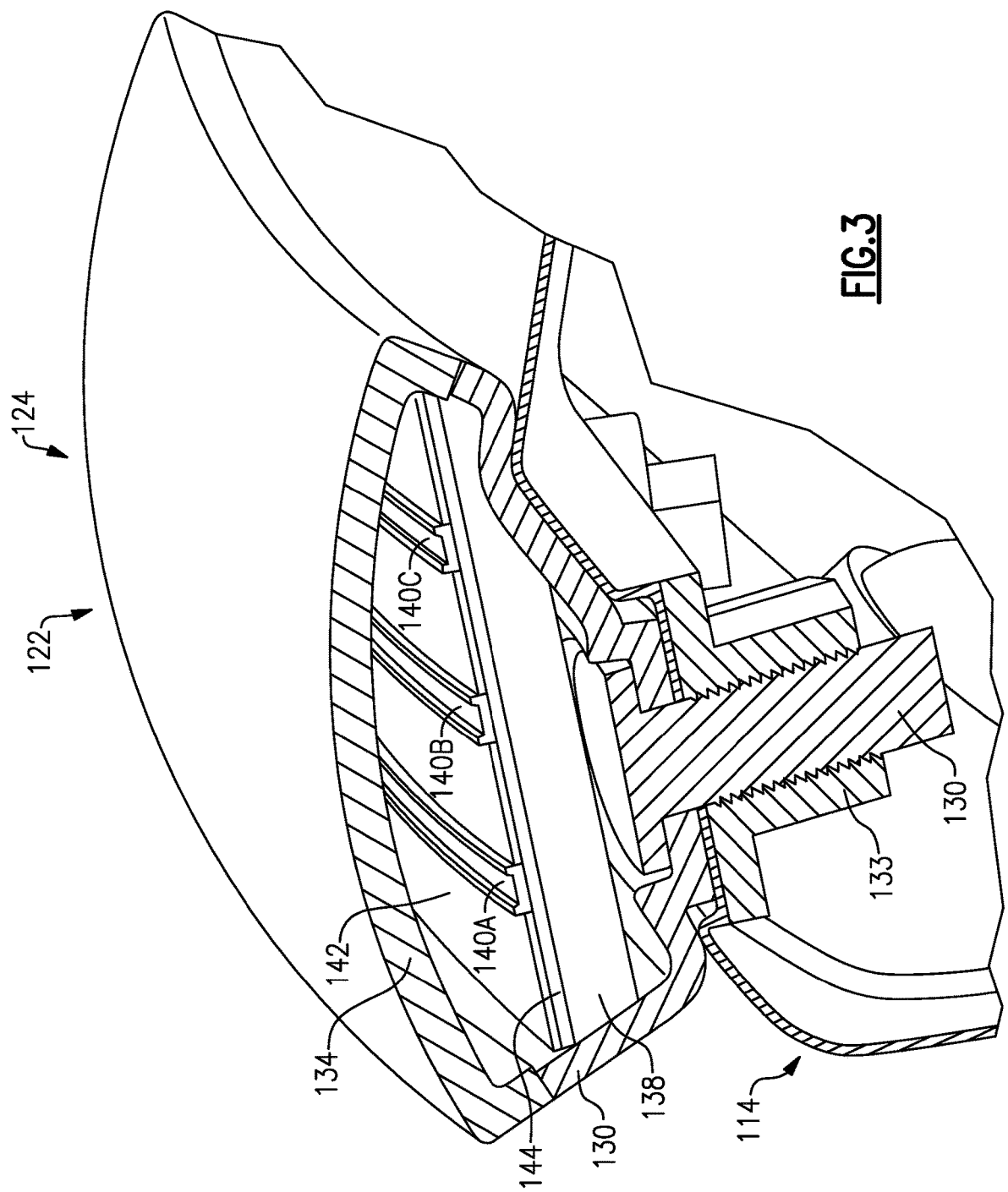
FIG. 3 is a view similar to FIG. 2 and illustrates another embodiment of the light assembly.

FIG. 3 is a cross-sectional view similar to FIG. 2, and illustrates additional detail of another embodiment of the light assembly 122. The light assembly 122 corresponds substantially to the light assembly 22 of FIG. 2, with like parts preappended with a "1."

While in FIG. 2 the light source is provided by a film-based LED 36, in FIG. 3 the light source is provided by a plurality of strips 140A-140C of LEDs, which are mounted to a bezel 142, which in turn is mounted to a printed circuit board (PCB) 144, which in turn is mounted to carrier 138. The strips of LEDs 140A-140C each extend substantially the entire length L. The PCB 144 may be in communication with each of the LEDs within the strips of LEDs 140A-140C, and may also be in communication with, or considered part of, the controller 26. Each strip of LEDs 140A-140C includes a plurality of spaced-apart LEDs along the length of the light assembly 122. Each strip of LEDs 140A-140C may be provided by Luxeon XF-3014 CV flexible LED strips offered commercially by Lumileds, as one example.

Each strip of LEDs 140A-140C may include LEDs illuminable in one or more colors. Each strip of LEDs 140A-140C may include LEDs of a common color, and each strip of LEDs 140A-140C may be able to illuminate in the same color, or a different color, relative to the other strips of LEDs 140A-140C. While three strips of LEDs are shown, this disclosure extends to light assemblies that include one or more strips of LEDs.

This disclosure also relates to various functions of the light assemblies 22, 122. Example functions will be described relative to the light assembly 22, but each of these functions may also be performed by light assembly 122.

In a first example function, the light assembly 22 is configured to illuminate when one or more signals from the sensor 28 indicate a user, which again may include the owner of the vehicle 10 and/or authorized users, is present. Specifically, when the vehicle 10 is off and the light assembly 22 is not illuminated, the light assembly 22 remains powered and such that the sensor 28 can generate a signal indicative of a user being present within a threshold distance of the vehicle 10. The signal may be based on a face of the user being recognized using a facial recognition technique, a key fob of the user being identified, or a mobile device of the user is identified, as examples. The signal may indicate a distance between the user and the vehicle 10, and the controller 26 can determine whether the user is approaching the vehicle 10 and/or within a threshold distance such that the light assembly 22 should be activated.

In response to the signal, the controller 26 is configured to command the light assembly 22 to illuminate, which serves as a "welcome" or "wake up" light to the user. In particular, the controller 26 can command the light assembly 22 to illuminate without requiring the user to press an "unlock" or other button on a key fob, for example. Rather, the "welcome" light is activated entirely passively by the vehicle 10 without requiring an input by the user.

The user can customize the "welcome" light, including selecting a custom color for the light assembly 22 to illuminate and/or selecting a custom light sequence. For instance, the user could select an amber light color that gradually fades on as their "welcome" light. As another example, the user could select a green light color that flashes three times in succession and remains on following the third flash. As yet another example, the user could select a light pattern that involves illuminating multiple colors at once, such as half blue and half red. Other example welcome light colors and sequences come within this disclosure. The user selections may be made using a human-machine interface of the vehicle 10, such as the vehicle infotainment system, or via a software application running on a mobile device of the user.

As another example of a "welcome" light, the controller 26 can command the light source to emit light at a gradually increasing intensity as the user approaches the vehicle 10. In this way, the intensity of light increases in proportion to a proximity of the user to the vehicle 10. In other words, the light grows brighter as the user approaches the vehicle 10.

The controller 26 can also command the light assembly 22 to function as a "farewell" light by illuminating in a custom color and/or sequence, selected by a user, when a user is departing the vehicle 10. As one example of a "farewell" light, the light intensity can gradually decrease as the user moves further from the vehicle 10.

The controller 26 can also command the light assembly 22 to activate when unidentified individuals come within a predefined range of the vehicle 10 as a security feature.

Other example functions include commanding the light assembly 22 to work in combination with other conspicuity lamps of the vehicle 10, including turn signals, brake lights, work lights, daytime running lamps, and 4-way flasher lights, as examples. For instance, when a user turns on a turn signal for a right-hand turn, the controller 26 commands the light assembly 22 to flash simultaneously with the turn signals of the vehicle 10. The controller 26 may command the light assembly 22 to flash in a color that is the same color as the forward turn signals of the vehicle 10. The controller 26 may also command the light assembly 22 to illuminate with the brake lights of the vehicle 10 in the same color as the other brake lights, such as a red color. The controller 26 may also command the light assembly 22 to flash with the 4-way flasher lights, when active.

Other example functions relate to the reaction of the light assembly 22 to various user inputs. In one example function, when a vehicle lock command is received, by the sensor 28 for example, the controller 26 is configured to command the light assembly 22 to flash three times, in a color such as white, in succession and on the third flash the controller 26 commands the light assembly 22 to gradually dim until the light assembly 22 is deactivated. Another example function includes when a vehicle remote start command is received, again by the sensor 28 for example, the controller 26 is configured to command the light assembly 22 to flash a first color, such as an amber color, three times in succession and on the third flash the controller 26 commands the light assembly 22 to remain illuminated while gradually transitioning the light source to another color, such as white. Other example reactions to user inputs come within the scope of this disclosure.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a frame including a pillar, wherein the pillar is an A-pillar;
a light assembly mounted to the pillar, wherein the light assembly includes a selectively illuminable light source;
a sensor configured to generate signals indicative of a presence of a user of the motor vehicle; and
a controller configured to command the light source to illuminate when the signals from the sensor indicate the user is present.

2. The motor vehicle as recited in claim 1, wherein, when the signals from the sensor indicate the user is present, the controller is configured to command the light source to illuminate in a custom color selected by the user.

3. The motor vehicle as recited in claim 1, wherein, when the signals from the sensor indicate the user is present, the controller is configured to command the light source to illuminate in a custom sequence selected by the user.

4. The motor vehicle as recited in claim 1, wherein the controller is configured to command the light source to increase in intensity in proportion to a proximity of the user to the motor vehicle.

5. The motor vehicle as recited in claim 1, wherein the controller is configured to command the light assembly to work in combination with a conspicuity lamp of the motor vehicle.

6. The motor vehicle as recited in claim 1, wherein the light assembly extends substantially an entire length of the A-pillar.

7. The motor vehicle as recited in claim 1, wherein the light source includes an optical, film-based, light emitting diode (LED).

8. The motor vehicle as recited in claim 1, wherein the light source includes a plurality of strips of light emitting diodes (LEDs).

9. The motor vehicle as recited in claim 1, wherein, when a vehicle lock command is received, the controller is configured to command the light source to flash three times in succession and on the third flash the controller commands the light source to gradually dim until the light source is deactivated.

10. The motor vehicle as recited in claim 1, wherein, when a vehicle remote start command is received, the controller is configured to command the light source to flash a first color three times in succession and on the third flash the controller commands the light source to remain illuminated while gradually transitioning the light source to another color.

11. A motor vehicle, comprising:
a frame including a pillar;
a light assembly mounted to the pillar, wherein the light assembly includes a selectively illuminable light source;
a sensor configured to generate signals indicative of a presence of a user of the motor vehicle;
a controller configured to command the light source to illuminate when the signals from the sensor indicate the user is present; and
a lens configured to direct light from the light source in a direction away from the vehicle.

12. The motor vehicle as recited in claim 11, wherein an exterior surface of the lens is a same color as an adjacent body panel of the motor vehicle.

13. The motor vehicle as recited in claim 11, wherein the lens includes a long persistent phosphor film configured to glow following deactivation of the light source.

14. A method, comprising:
illuminating a light source of a light assembly mounted to a pillar of a motor vehicle when a presence of a user is detected, and wherein at least one of the following sequences occurs: (i) in response to a vehicle lock command, the light source flashes three times in succession and on the third flash the light source gradually dims until the light source is deactivated, or (ii) in response to a vehicle remote start command, the light source to flashes a first color three times in succession and on the third flash the light source remains illuminated while gradually transitioning the light source to another color.

15. The method as recited in claim 14, wherein the light source is illuminated in a custom color selected by the user.

16. The motor vehicle as recited in claim 14, wherein the light source is illuminated in a custom sequence selected by the user.

17. The method as recited in claim 14, wherein the light source increases in intensity in proportion to a proximity of the user to the motor vehicle.

18. The method recited in claim 14, wherein, in response to a vehicle lock command, the light source flashes three times in succession and on the third flash the light source gradually dims until the light source is deactivated.

19. The method as recited in claim 14, wherein, in response to a vehicle remote start command, the light source to flashes a first color three times in succession and on the third flash the light source remains illuminated while gradually transitioning the light source to another color.

* * * * *